United States Patent [19]

Tall

[11] 4,110,142
[45] Aug. 29, 1978

[54] METHOD OF SPLICING MULTITRACK SOUND RECORDING TAPE

[75] Inventor: Joel Tall, Washington, D.C.

[73] Assignee: Joel Tall, Inc., Mount Vernon, N.Y.

[21] Appl. No.: 842,875

[22] Filed: Oct. 17, 1977

Related U.S. Application Data

[63] Continuation-in-part of Ser. No. 737,101, Oct. 29, 1976, abandoned.

[51] Int. Cl.² ............................................. G11B 27/06
[52] U.S. Cl. ................................... 156/159; 156/502; 360/13
[58] Field of Search ............... 156/505, 502, 157, 159, 156/13; 360/13

[56] References Cited

U.S. PATENT DOCUMENTS 2,599,667  6/1952  Tall ................................. 156/505

OTHER PUBLICATIONS

N. M. Haynes, *Elements of Magnetic Tape Recording*, Prentice-Hall, Inc., N. J. 1957.

*Primary Examiner*—David Klein
*Assistant Examiner*—William H. Thrower
*Attorney, Agent, or Firm*—Bacon & Thomas

[57] ABSTRACT

A splicing block for and a method of splicing multitrack magnetic sound recording tape includes a block having a longitudinal groove therein with a transverse slit thereacross. The angle of the slit is such that one outside track leads the other by 0.150 inch regardless of the tape width. The tape pieces to be spliced are set in the block, cut in the slit, and then joined wherein the splice is effected so that one outside track leads the other by 0.150 inch.

1 Claim, 4 Drawing Figures

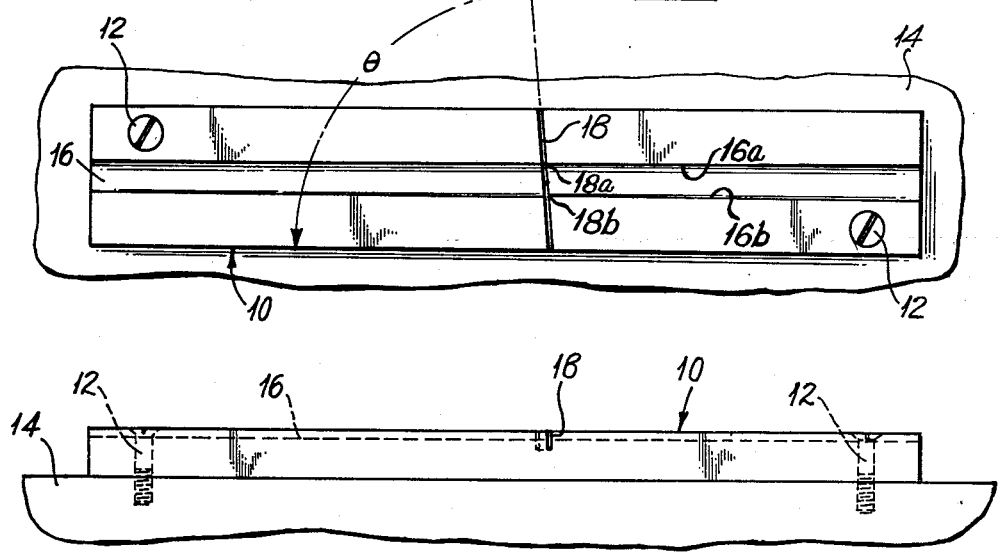
Fig. 1.
Fig. 2.
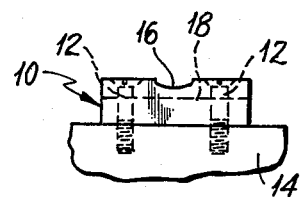
Fig. 3.
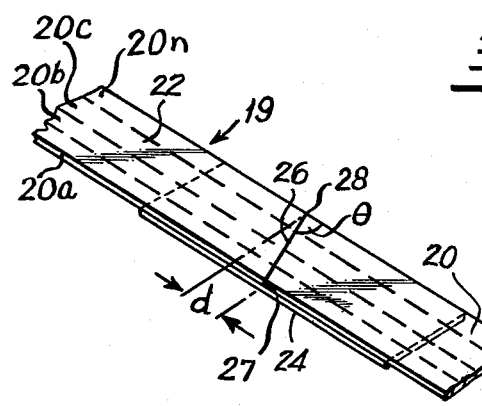
Fig. 4.

METHOD OF SPLICING MULTITRACK SOUND RECORDING TAPE

This is a continuation-in-part application of Ser. No. 737,101 filed Oct. 29,1976, now abandoned.

BACKGROUND OF THE INVENTION

The invention relates to splicing blocks, particularly splicing blocks for use in editing multitrack magnetic sound recording tape.

Specifically, this invention is an improvement over my prior U.S. Pat. No. 2,599,667, issued June 10,1952, which is incorporated herein by reference.

In ordinary single-track tape editing, it is sufficient to edit the tapes at points where sound levels and the sound character insure that a smooth, noiseless crossfade can be obtained where one sound joins another. In order to accomplish the editing of a single track tape, my prior patent provided adequate means.

Illustrated in U.S. Pat. No. 2,599,667 is a splicing block having a longitudinal groove therein. Further, there is a transverse slit at 90° to the longitudinal groove, as well as a slit at 45° to the longitudinal groove.

While the splicing of a tape at a 45° angle is quite acceptable for single track tapes, it is not acceptable for multitrack tapes. With more than one track of sound recorded on the tape in the same direction, it is necessary that the sound of all tracks be edited within the same instant of time; otherwise, one or more tracks might noticeably lead or lag the others. According to accepted hearing theory, the time segment should be no longer than 0.02 to 0.03 seconds to go unnoticed by listeners with normally acute hearing.

If one cuts the tape during the editing process at 90° using the transverse slit of my earlier patent, there are two phenomena that would cause a noise click to be heard:

(1) Magnetic recording is accomplished by the mixing of bias current and audio currents. When a tape is cut, the inaudible bias current may be cut on one segment where its voltage is above normal, and on another segment where its voltage is below normal. If two tapes to be spliced together exist in this condition, a noise click will be heard from the voltage jump at the splice. Therefore, a slanting cut must be made so that bias voltages present will be averaged and made inaudible at the splice.

(2) In cutting and splicing at 90°, some iron oxide may very likely gather at the splice. The gathering of the iron oxide at the splice might, itself, cause noise at the splice. A slanting cut will obviate this effect as well.

SUMMARY OF THE INVENTION

It is an object of this invention to provide a splicing block which will permit the editing of multitrack tapes without the occurrence of a noise click caused by the prior art cutting methods.

The present invention envisions a splicing block of the type shown in my earlier patent wherein the cutting slit is as abrupt as possible so that no time lead or lag is observable in multitrack tape editing, while at the same time not being so close to 90° that noise will occur from the phenomena discussed above.

Further, the tape should be edited on attack sounds, both in music and speech, since attack sound consists of wideband noise. Thus, any slight noise produced will not be observed by the listener.

The invention consists of a splicing block having a longitudinal groove to receive two pieces of multitrack tape to be spliced therein and a groove having a slit such that one outside track leads the other by 0.150 inch. The slant of the slit in editing tape recorded at 15 inches per second would yield a lead or lag no more than 0.01 second which is the time segment, according to this invention, that will go unnoticed by musicians and others with trained acute hearing. At a tape speed of 7.5 inches per second, the lead or lag would be no more than 0.02 second.

BRIEF DESCRIPTION OF THE DRAWINGS

The foregoing and other objects, features and advantages of the invention will become more apparent from the following detailed description and accompanying drawings wherein:

FIG. 1 is a top plan view of a splicing block according to the invention;

FIG. 2 is a side elevation view of the splicing block of FIG. 1;

FIG. 3 is an end view of the splicing block of FIGS. 1 and 2; and

FIG. 4 is a perspective view of a spliced tape made in accordance with the invention.

DETAILED DESCRIPTION OF THE INVENTION

Referring to FIGS. 1-3 of the drawings, a block 10 is made from a suitable non-magnetizable material such as aluminum and is of rectangular cross-section. A pair of mounting holes and associated screws 12 are provided for fastening blocks 10 to a table 14 or other object.

A longitudinal groove 16 extends from one end of the block to the other. At a point appropriately located relative to the end of the block is positioned at an angle 0 with respect to the longitudinal extent of the groove. The width of the slit 18 is of such a size as to accommodate a razor blade which may be used in cutting the tape wherein leading and lagging points of cut 18a and 18b, respectively, occur at opposite boundaries 16a and 16b of the groove 16.

Reference is made to my previous patent for appropriate dimensions and construction of the longitudinal groove 16.

Referring now to FIG. 4, there is shown a length of multitrack magnetic tape 19 which has a splice 26 therein joining first and second sections 20 and 22 by means of a piece of splicing tape 24. The tape 19 has a plurality of longitudinally extending tracks 20a, 20b, 20c and 20n thereon. While four tracks 20a-20n are shown for purposes of illustration, the tape 19 could include any reasonable number of tracks. Generally, multitrack sound tape will have 2, 4, 8, 16 or 24 tracks and will have a width of ¼ inch to 2 inches. The sounds recorded on the tracks are synchronized so as to interact with one another and on the ear of a listener when played or read simultaneously.

Referring now to FIGS. 1 and 4, it has been found that the slit 18 should be slanted with respect to the longitudinal extent of the tape 19 so that the point of cut 27 at the edge of one outside track 20a leads the point of cut 28 at the edge of the other outside track 20n by a distance $d$ of one hundred fifty thousandths of an inch (0.150 inch). This distance $d$ remains constant regardless of the width of the tape 19 or the number of tracks 20a–20n recorded on the tape. It has been found that when a splice 26 is cut with the 0.150 inch lead and within the wide band noise at the inception of a sound, the splice lies within the ear's "circle of confusion" and is not heard or recognized by the ear.

The width of the slot 16 in the block 10 varies with the width of tape being spliced. For example, a 2 inch tape 19 will use a block 10 having a slot 16 approximately 2 inches wide when measured linearly across the curved cros section of FIG. 3 and a one quarter inch tape will use another block 10 having a slot 16 approximately one quarter of an inch wide. For the actual configuration of the slot 16 the principles disclosed in the aforementioned U.S. Pat. No. 2,599,667 are applied. The angle $\theta$ also varied with the width of the tape 19 and width of the slot 16 in order to maintain the distance $d$ equal to 0.150 inch. In constructing various splicing blocks 10 an angle $\theta$ of about 61° provides a good splice cut for $\frac{1}{4}$ inch tape while an angle $\theta$ of about 87° provides a good splice cut for 2 inch tape. The appropriate angle $\theta$ may be derived generally according to the following relationships:

Tangent $\theta \sim$ width of tape in inches/0.150 inch

In machining the actual slit 18 in the blocks 10, $\theta$ may vary approximately $+/-3$ degrees from the above derivation, however $\theta$ generally follows the above derivation in that it increases with the width of tape according to the tangent of $\theta$ with the denominator held constant at 0.150 inch.

The reason that the lead $d$ of 0.150 works is that most tape editors work with tapes which are advanced at 15 inches per second. In order for the time segment for the lead of one track of the tape to be unrecognizable to a person having acute hearing, the lead should be no more than 0.01 seconds. At 15 inches per second, the lead distance will be 0.150 inch to achieve the 0.01 second interval. This is really seen by the following relationship:

0.01 sec × 15 inches/sec = 0.150 inch

It is the 0.01 second time interval which contains the splice within the circle of confusion so that it is not recognized by the ear.

In order to edit, the multitrack tape having at least two synchronized audio frequency tracks thereon is stretched into the longitudinal groove 16 of the splicing block. By means of the tips of the fingers, the tape is pushed down against the bottom of the groove until it is held in a firm grip between the edges of the groove which slant inwardly as shown in my previous patent. The tape is next cut by sliding the cutting edge of a razor blade, or the like, through slit 18. A piece may be cut out or a new piece may be inserted wherein the procedure in both cases is the same. The two ends of the splice are then brought together in longitudinal groove 16 with care taken to see that the ends abut properly and are in proper alignment in intimate contact along the cut. A piece of splicing tape is next pressed down over the splice, and the tape is removed from the groove, and the excess splicing tape is cut on both sides of the sound tape.

The splicing tape 24 may be pre-cut several thousandths of an inch narrower than the magnetic tape 19 and manufactured in such a fashion that a piece of splicing tape can be quickly detached and affixed to the recording tape's splicing area. Further, pre-packaged splicing tape with plastic overlays can be provided to readily permit the splicing to be done quickly and efficiently. The particular means of affixing the splicing tape does not form a part of the invention.

While one embodiment of the invention has been described, it will be understood that it is capable of many further modifications, and this application is intended to cover any variations, uses, or adaptions of the invention following, in general, the principles of the invention and including such departures from the present disclosure as come within the knowledge or customary practice in the art to which the invention pertains, and as may be applied to the essential features hereinbefore set forth and fall within the scope of the invention or the limits of the appended claims.

I claim:

1. A method of splicing magnetic sound recording tape with a splicing block in order to edit the tape by joining two pieces of the tape, wherein the tape is multitrack tape having two or more synchronized audio frequency tracks extending there along, comprising the steps of:
   (a) using a standard editing speed of fifteen inches per second for recording and playing the multitrack tape;
   (b) selecting a portion of the multitrack tape having wideband noise;
   (c) selecting a splicing block with a groove therein having a width approximately the width of the multitrack tape and a straight slit which intersects and traverses the groove at an angle $\theta$ therewith, wherein the angle $\theta$ is selected so that the distance between the leading point of cut at one edge of the multitrack tape and the lagging point of cut at the other edge of the multitrack tape is approximately 0.150 inch regardless of the width of the multitrack tape and the number of synchronized tracks on the tape;
   (d) placing the pieces of multitrack tape in the groove, one at a time, with the selected portion of the tape having wideband noise aligned with the slit;
   (e) cutting the pieces of multitrack tape by passing an instrument with a straight sharp blade through the slit and through the wide band noise portion of the multitrack tape, across all tracks of the tape, wherein by virtue of the blade following the slit, the distance between the leading point of cut at one edge of the tape and the lagging point of cut at the other edge of the tape is approximately 0.150 inch regardless of the width of the tape and the number of synchronized tracks on the tape;
   (f) aligning the edges of the cuts of the pieces to be spliced so as to align the tracks with one another;
   (g) joining the two pieces of tape cut in accordance with step e) by adhering a length of splice tape in overlapping relationship with the two pieces so that when the multitrack tape is played at a speed of fifteen inches per second, the time segment between the leading and lagging points of cut will be approximately 0.01 second regardless of the width of the tape and number of synchronized tracks on the tape.

* * * * *